Nov. 19, 1940.  E. A. HAVELES  2,222,258

CHECK PAD CASING

Filed March 16, 1938

INVENTOR.
Evangel A. Haveles
BY A. B. Bowman
ATTORNEY.

Patented Nov. 19, 1940

2,222,258

UNITED STATES PATENT OFFICE 2,222,258

CHECK PAD CASING

Evangel A. Haveles, Los Angeles, Calif.

Application March 16, 1938, Serial No. 196,222

1 Claim. (Cl. 312—141)

My invention relates to a check pad casing for holding restaurant or other check pads and the objects of my invention are:

First, to provide a check pad casing for storing check pads, with indicating numbers to indicate the number of check pads on hand;

Second, to provide a check pad casing of this class in which the pads for the different clerks may be kept in their numerical order ready for use;

Third, to provide a casing of this class which may be taken apart and readily sterilized and cleaned;

Fourth, to provide a casing of this class in which the different shelves are removable and shiftable;

Fifth, to provide a check pad casing of this class which may be made up in several units positioned side by side;

Sixth, to provide a check pad casing of this class in which the shelves are inclined so that the check pad has a tendency to stay in the shelf;

Seventh, to provide a check pad casing of this class in which the check pads may be quickly inserted and removed;

Eighth, to provide a check pad casing of this class which is very simple and economical of construction, efficient in its action and which will not readily deteriorate or get out of order.

Figure 1:
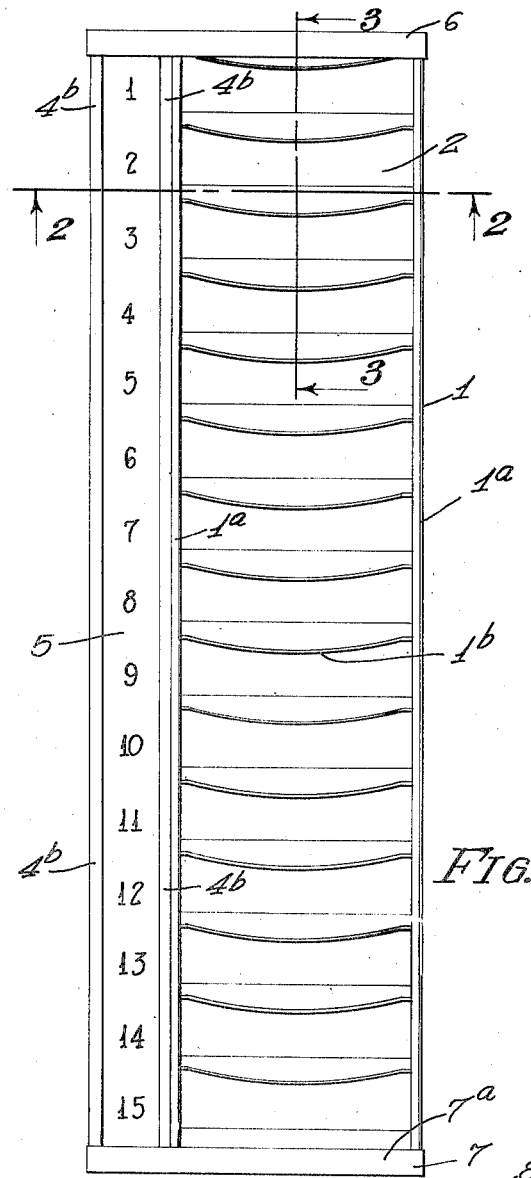
Figure 2:
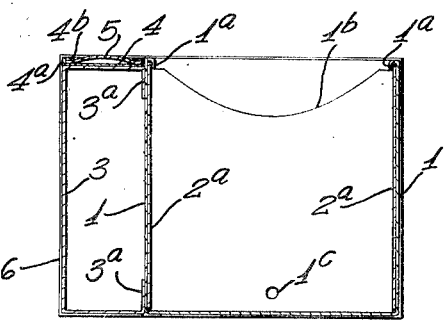
Figure 3:
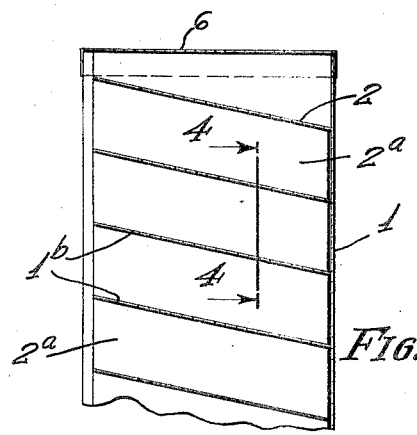
Figure 4:
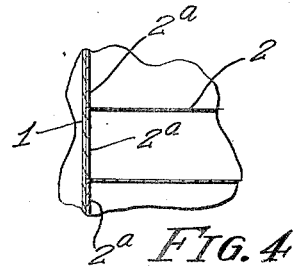
Figure 5:
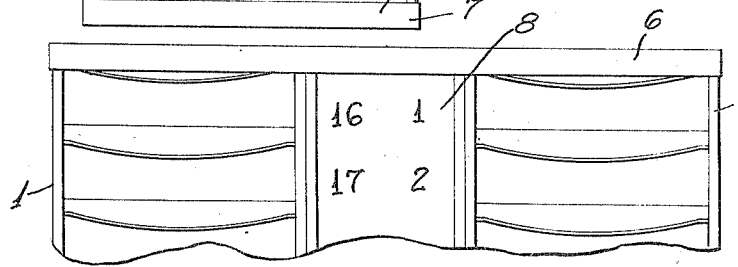

With these and other objects in view as will appear hereinafter, my invention consists of certain novel features of construction, combination, and arrangement of parts and portions as will be hereinafter described in detail and particularly set forth in the appended claim, reference being had to the accompanying drawing and to the characters of reference thereon which form a part of this application in which:

Figure 1 is a front elevational view of my check pad casing in its preferred form; Fig. 2 is a transverse sectional view taken along the line 2—2 of Fig. 1; Fig. 3 is another sectional view taken along the line 3—3 of Fig. 1; Fig. 4 is a fragmentary sectional view taken along the line 4—4 of Fig. 3; Fig. 5 is a fragmentary front elevational view of the top portion of a casing in a slightly modified form from that of the other views of the drawing.

Similar characters of reference refer to similar parts and portions throughout the several views of the drawing:

The main casing member 1, shelf members 2, casing member 3, indicator casing member 4, indicator slides 5, cap member 6, and base member 7 constitute the principal parts and portions of my check pad casing in its preferred form.

The main casing 1 is an elongated casing, U-shaped in cross section as shown best in Fig. 2 of the drawing, and it is provided at its edges with folded back portions 1a providing grooves at the opposite edges. Over the lower end is provided a base member 7 which is provided with an upwardly turned flange 7a which extends past the one side thereof and forms the base for the casing member 3 as well as the casing member 1 and is secured thereon by spot welding, or otherwise. Mounted in the casing member 1 are a plurality of shelf members 2, each of which is provided with downwardly extending lips 2a at opposite sides. These lips 2a extend forwardly and their extended ends fit in the grooves formed by the turned back portion 1a, while their other ends rest against the bottom of the U-shaped casing member 1. These lip members form spacers for spacing the shelves a certain distance apart. These shelf members are positioned on an angle so that their back portions are considerably lower than their front portions, as shown best in Fig. 3 of the drawing. Each of the shelf members is provided at its front side with a cut away portion 1b which provides a space to facilitate the grasping of the pads positioned on the shelves. Each of these shelves is also provided with a hole 1c to provide means for hanging the shelves or nesting them for transportation purposes.

Secured against one side of the member 1 is the casing member 3 which is considerably narrower and is rectangular in shape and hollow and provided with flanges 3a which are spot welded or otherwise secured to the one side of the member 1 as shown best in Fig. 2 of the drawing, the back side of said member being substantially flush with the back side of the casing member 1. The front side, however, is set backwardly some distance and in which is mounted the indicator casing member 4 which rests against the front side of the member 3 and is provided with outwardly extending portions 4a and with inwardly turned portions 4b forming grooves between the body portion and the inwardly turned portions in which is mounted the indicator slides 5. The indicator slides are somewhat wider than the casing members 4 so that when they are placed in position their front sides are bowed outwardly as shown best in Fig. 2 of the drawing. They are preferably made of white material and are provided on the front bulged side with numbers which are coincident with the space between the shelves and serve as numbers for the space between the shelves, which spaces are for receiving the separate check pads. Mounted over the top of both of the cases 1 and 3 and the indicator casing 4 is a cap member 6 which is provided with holes in the sides adapted to engage lugs integrally punched from the sides of the casing members 1 and 3 for securing the cap member in position on the top.

In the modified form of construction shown in Fig. 5 of the drawing there are two casing members 1 positioned side by side in spaced relation and interposed between these casing members 1 is a casing member similar to the casing member 3 except some wider and the indicator casing positioned in the front side is also wider and receives wider indicating slides 8 which are provided with a double row of indicator numbers, thus providing for the storage of a double quantity of the check pads. The base and cap members are the same as the base and cap 7 and 6 except that they are extended so that they extend over both units as well as the wider intermediate casing and indicator slides.

Though I have shown and described a particular construction, combination, and arrangement of parts and portions, and a certain modification therefrom, I do not wish to be limited to this particular construction, combination, and arrangement, nor to the modification, but desire to include in the scope of my invention, the construction, combination, and arrangement substantially as set forth in the appended claim.

Having thus described my invention, what I claim as new and desire to secure by Letters Patent is:

In a check pad casing, a casing member substantially U-shaped in cross section and provided with vertical grooves facing backwardly at its front side and a plurality of shelves with downwardly extending lips, which lips are provided with forwardly extended portions adapted to fit in said grooves and said lips resting on the adjacent shelf.

EVANGEL A. HAVELES.